(12) United States Patent
Nakamura et al.

(10) Patent No.: US 6,995,949 B2
(45) Date of Patent: Feb. 7, 2006

(54) MAGNETIC HEADS FOR PERPENDICULAR RECORDING AND MAGNETIC RECORDING DISK APPARATUS USING THE SAME

(75) Inventors: Atsushi Nakamura, Kodaira (JP); Masafumi Mochizuki, Kokubunji (JP); Tomohiro Okada, Odawara (JP); Kimitoshi Etoh, Odawara (JP); Isao Nunokawa, Odawara (JP); Yoshiaki Kawato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/116,301

(22) Filed: Apr. 28, 2005

(65) Prior Publication Data
US 2005/0185335 A1    Aug. 25, 2005

Related U.S. Application Data

(62) Division of application No. 10/974,807, filed on Oct. 28, 2004, now Pat. No. 6,891,697, which is a division of application No. 10/314,156, filed on Dec. 9, 2002, now Pat. No. 6,813,116.

(30) Foreign Application Priority Data
Feb. 14, 2002    (JP)    ............................. 2002-036126

(51) Int. Cl.
 *G11B 5/187* (2006.01)
(52) U.S. Cl. ..................................................... 360/125
(58) Field of Classification Search ...................... None
See application file for complete search history.

(56) References Cited

U.S. PATENT DOCUMENTS

| | | | |
|---|---|---|---|
| 6,504,675 B1 | 1/2003 | Shukh et al. | |
| 6,697,221 B2 * | 2/2004 | Sato et al. | 360/126 |
| 6,710,973 B2 | 3/2004 | Okada et al. | |
| 6,809,899 B1 * | 10/2004 | Chen et al. | 360/125 |
| 6,813,116 B2 * | 11/2004 | Nakamura et al. | 360/125 |
| 6,891,697 B2 * | 5/2005 | Nakamura et al. | 360/125 |

FOREIGN PATENT DOCUMENTS

| | | |
|---|---|---|
| JP | 2001-256605 A | 9/2001 |
| JP | 2002-92821 A | 3/2002 |

OTHER PUBLICATIONS

"Drive Integration Challenges for Perpendicular Recording", S. Lambert et al, Advanced Development Labs., Quantum Corp., Milpitas, CA, pp. 131-132, 2000.

* cited by examiner

*Primary Examiner*—Robert S. Tupper
(74) *Attorney, Agent, or Firm*—Antonelli, Terry, Stout and Kraus, LLP

(57) ABSTRACT

A magnetic head includes a main pole having a first portion with a length (W1) in a cross-track direction which continuously increases from a leading edge side to a trailing edge side, a second portion formed on a trailing edge side of the first portion, and a third portion formed on a trailing edge side of the second portion. A length (W2) in the cross-track direction of a boundary line between the second portion and the third portion is longer than W1, and a length (W3) in the cross-track direction of a trailing edge of a third portion is substantially equal to W2.

6 Claims, 11 Drawing Sheets

FIG.4A
FIG.4B
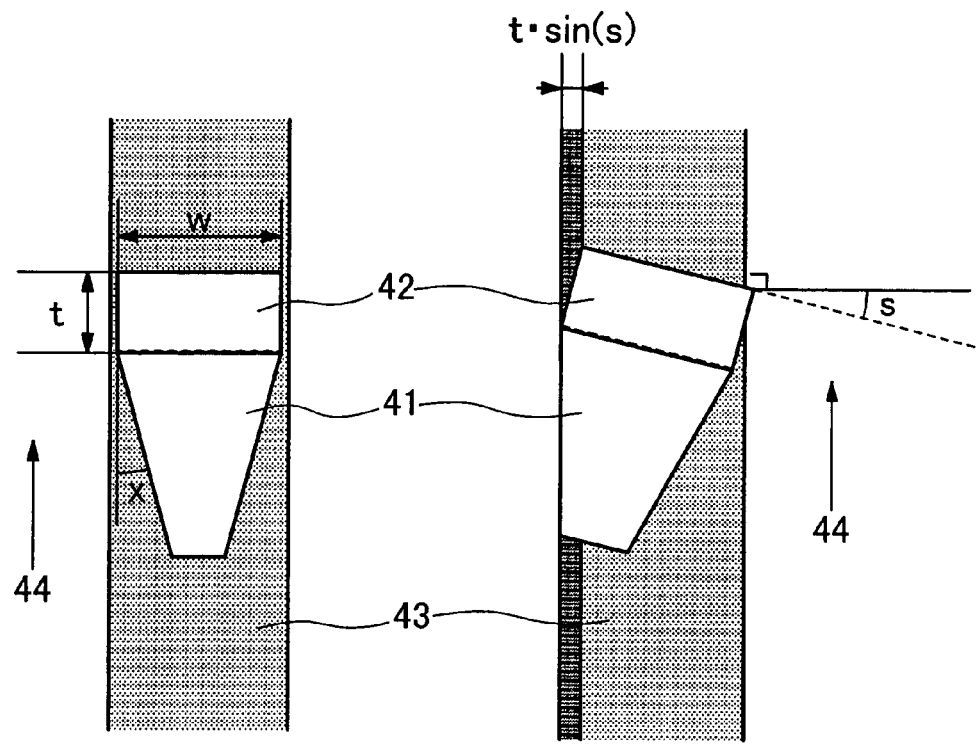
FIG.5
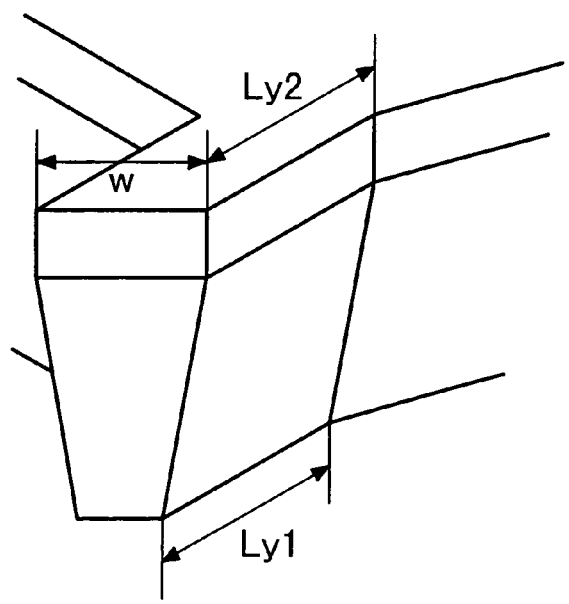

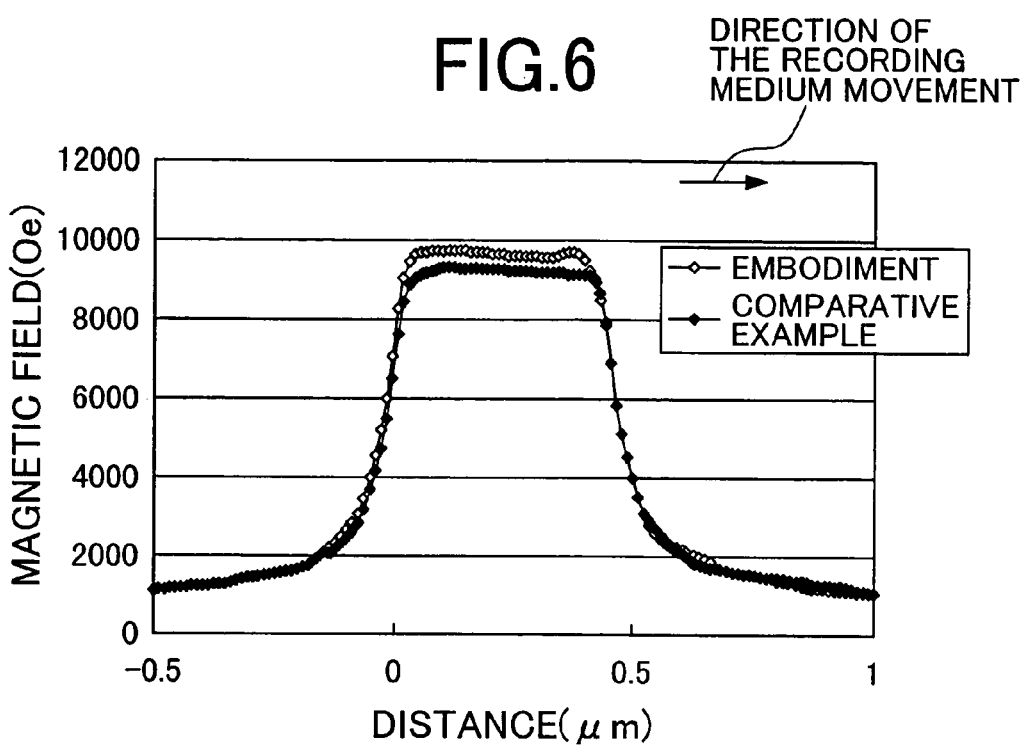
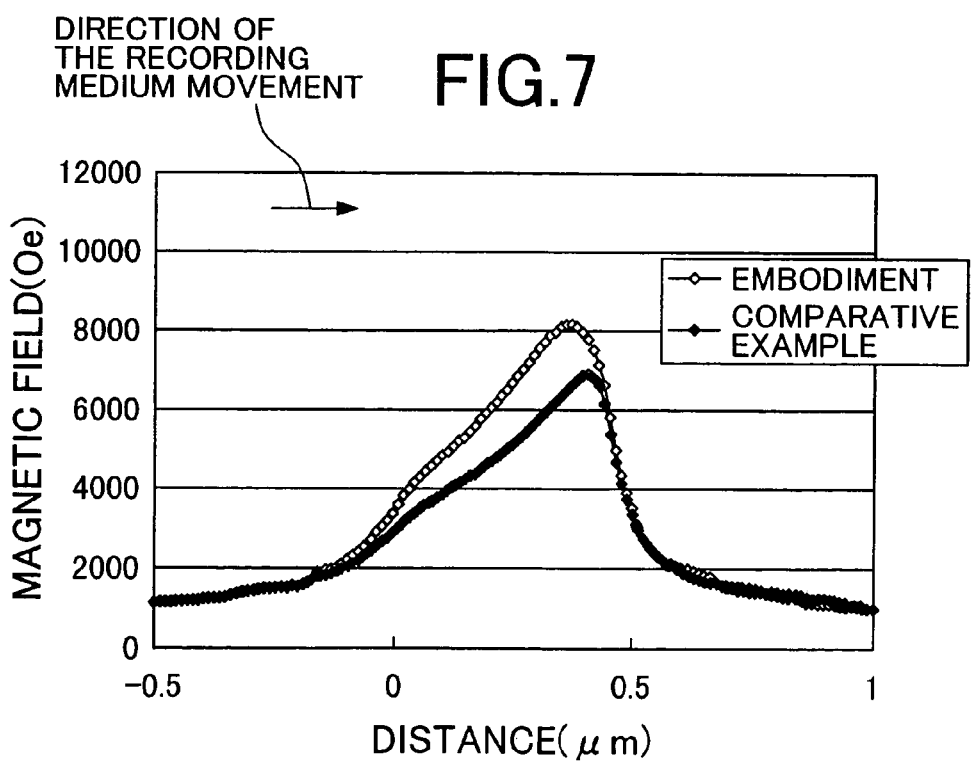

FIG.14
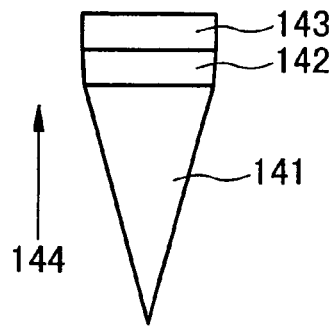
FIG.15A
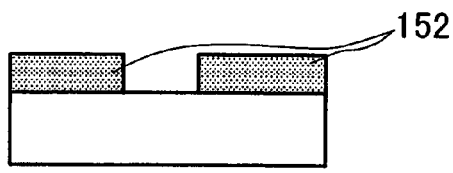
FIG.15B
FIG.15C
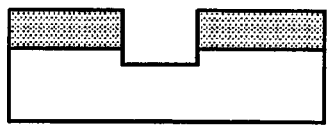
FIG.15D
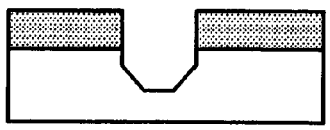
FIG.15E
FIG.15F
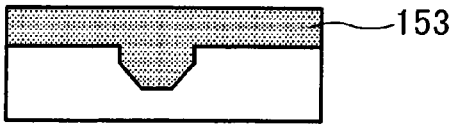
FIG.15G

MAGNETIC HEADS FOR PERPENDICULAR RECORDING AND MAGNETIC RECORDING DISK APPARATUS USING THE SAME

CROSS REFERENCE TO RELATED APPLICATION

This is a divisional of U.S. application Ser. No. 10/974,807, filed Oct. 28, 2004, now U.S. Pat. No. 6,891,697 which is a divisional of U.S. Ser. No. 10/314,156, filed Dec. 9, 2002, now U.S. Pat. No. 6,813,116, the subject matter of which is incorporated by reference herein.

BACKGROUND OF THE INVENTION

The present invention relates to the structure of a main pole of a magnetic head for perpendicular recording, a process of manufacturing the same and a magnetic recording disk apparatus using the same.

One possible approach to increasing the areal recording density of a magnetic disk is to use a perpendicular recording method, instead of the conventional in-plane magnetic recording method. In magnetic perpendicular recording, the recorded magnetization formed in a recording medium is perpendicular to the film face. This recording method offers an advantage in that microscopic recorded magnetization is thermally stable. A magnetic head for perpendicular recording may be a write/read dual element head, in which use should be made of a magnetoresistive effect type head as a read head and a single-pole type head, consisting of a main pole and an auxiliary pole, as a write head. In the single-pole type head, a magnetic field necessary for recording is generated from the main pole, which is tailored to the recording track width. For this reason, the shape of the main pole on the head surface facing the recording medium largely affects the distribution of recorded magnetization. It can be demonstrated, for example, by comparison between the case of FIG. 1A and the case of FIG. 1B. In the case of FIG. 1A, in which a main pole 12 is shown as a rectangle which is determined by the track width and pole thickness, and the angle formed by the direction perpendicular to a recording track 11 and the main pole's cross-track direction, namely what is called a "yaw angle," is O degree, writing (recording) is effected depending on the width of the downstream edge of the main pole in a medium moving direction 15, and thus no side writing occurs. On the other hand, in the case of FIG. 1B, in which there is a yaw angle, a considerable amount of side writing 13 will occur, depending on the main pole edge in the direction of the thickness. As an attempt to prevent such side writing, a trapezoidal main pole 12 has been used, as illustrated in FIG. 1C and FIG. 1D. In other words, the main pole's downstream edge, in the medium moving direction 15, and its neighboring side edge crossing it form an acute angle. Reference to this type of main pole has been made, for example, in JP-B No. 286842/2000 and Digests of PMRC 2000 (2000) pp. 131–132.

The above-mentioned shape, which is intended to decrease the amount of side writing in a situation that there is a yaw angle, has the following problem: since the pole thickness is smaller at the track edge, the head's recording performance is lower in an area nearer to the track edge, and, thus, the effective track width decreases. This is a barrier to improvement in the track density.

SUMMARY OF THE INVENTION

One object of the present invention is to increase the recording performance at the track edge, while suppressing the amount of side writing, thereby preventing the effective track width from decreasing. Another object of the present invention is to provide a magnetic recording disk apparatus having an increased track density and which uses the above-mentioned magnetic head.

In order to solve the above-mentioned problem, the main pole according to the present invention has the following profile on the air bearing surface: it is composed of a first portion and a second portion, where the length of the first portion in the cross-track direction continuously increases in the direction from the upstream side in the medium moving direction (namely the leading edge) to the downstream side in the medium moving direction (namely the trailing edge); the second portion is located on the side of the trailing edge of the first portion; and the length in the cross-track direction at the point of contact between the first and second portions is equal to or shorter than the second portion's length in the cross-track direction at the trailing edge.

The use of a magnetic head having a main pole, with the above-mentioned profile, increases the recording performance at the track edge, while suppressing the amount of side writing, thereby preventing the effective track width from decreasing. Furthermore, it is possible to provide a magnetic recording disk apparatus which uses a magnetic head with a main pole according to the present invention and thus improve the track density.

BRIEF DESCRIPTION OF THE DRAWINGS

FIG. 4A is a schematic diagram showing a main pole and a recording track according to an embodiment of the present invention; and FIG. 4B is a schematic diagram showing a main pole with a yaw angle and a recording track according to an embodiment of the present invention;

FIG. 5 is a diagram which shows the structure of a main pole according to an embodiment of the present invention;

FIG. 6 is a graph showing the magnetic field distribution according to an embodiment of the present invention;

FIG. 7 is a graph showing the magnetic field distribution according to an embodiment of the present invention;

FIG. 14 is a schematic diagram showing the structure of a main pole according to an embodiment of the present invention;

FIG. 15A shows an inorganic insulation film in the main pole manufacturing process according to the present invention; FIG. 15B shows a resist pattern formed on the inorganic film in the main pole manufacturing process; FIG. 15C shows anisotropic etching carried out on the inorganic insulation film in the main pole manufacturing process; FIG. 15D shows taper etching in the main pole manufacturing process; FIG. 15E shows removal of the resist in the main pole manufacturing process; FIG. 15F shows formation of a magnetic film in the main pole manufacturing process; and FIG. 15G shows a main pole formed on a planarized magnetic film in the main pole manufacturing process;

DETAILED DESCRIPTION OF THE PREFERRED EMBODIMENTS

Embodiment 1

Figure 1A:
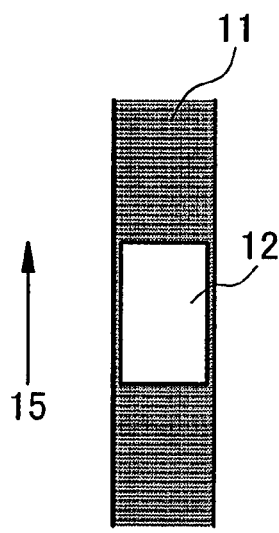
FIG. 1A is a schematic diagram showing a rectangular main pole and a recording track having a known configuration.
Figure 1B:
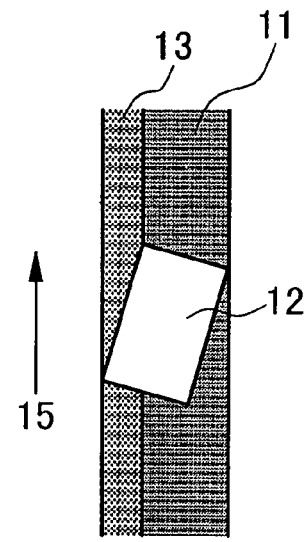
FIG. 1B is a schematic diagram showing a main pole with a yaw angle and a recording track having a known configuration.
Figure 1C:
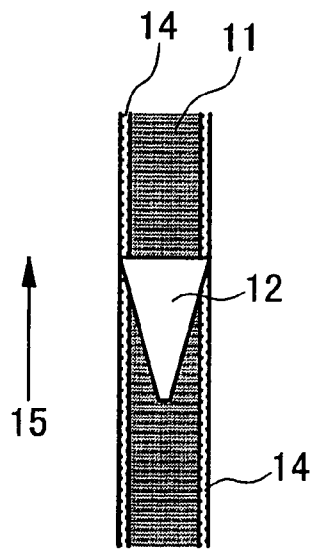
FIG. 1C is a schematic diagram showing a trapezoidal main pole and a recording track having a known configuration.
Figure 1D:
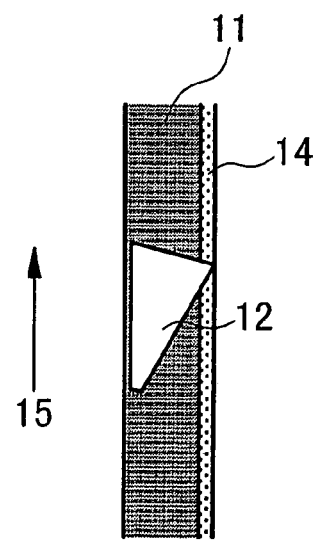
FIG. 1D is a schematic diagram showing a trapezoidal main pole with a yaw angle and a recording track having a known configuration.
Figure 2A:
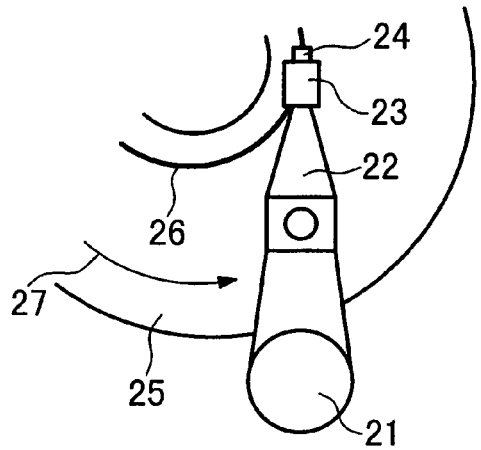
FIG. 2A is a diagram which shows a magnetic recording disk apparatus according to an embodiment of the present invention, where the yaw angle is 0 degree.
Figure 2B:
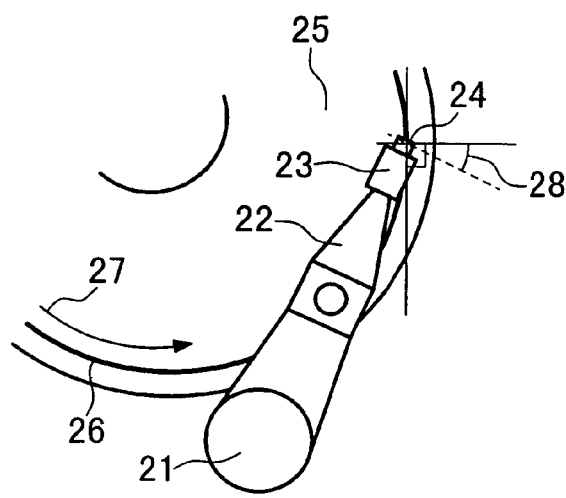
FIG. 2B is a diagram which shows a magnetic recording disk apparatus according to an embodiment of the present invention, where the yaw angle is not 0 degree.
Figure 18:
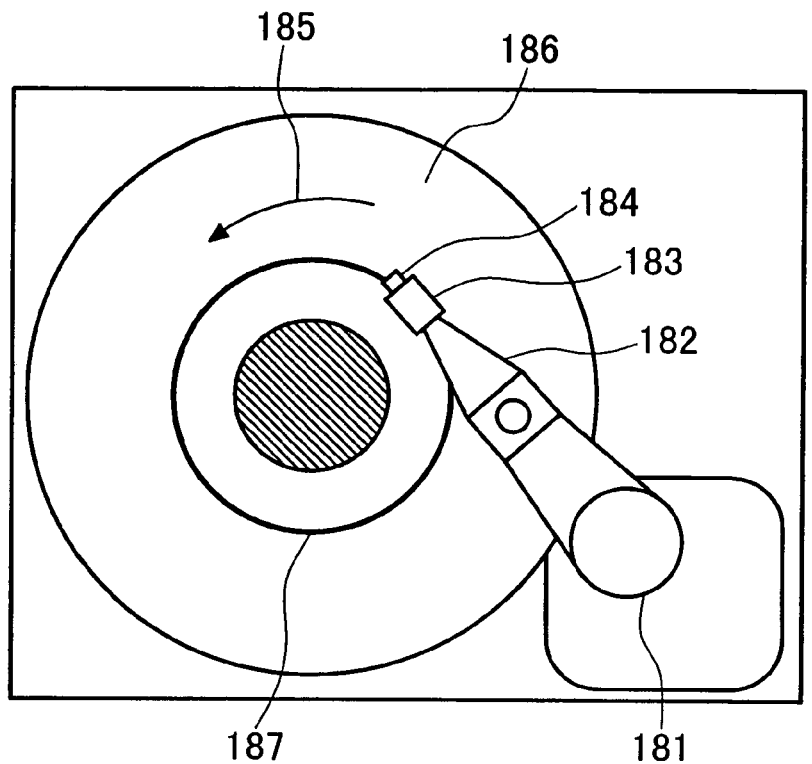
FIG. 18 is a diagram which shows a magnetic recording disk apparatus according to an embodiment of the present invention.

FIG. 18 is a schematic view showing a magnetic recording disk apparatus representing an embodiment of the present invention. A slider 183 is fixed at the tip of a suspension arm 182 supported by a rotary actuator 181. There is a supporting mechanism referred to as gimbals (not shown) at the tip of the suspension arm 182. The slider is fixed through the gimbals to the suspension arm. Data is written to or read from a medium 186 for perpendicular recording, which rotates in an indicated rotational direction 185, through a magnetic head element 184 provided at the tip of the slider. The recording head element 184 uses a single-pole type head for writing and a magnetoresistive effect head for reading. As the rotary actuator 181 rotates, the head element 184 is moved to a position with a different radius on the disk. In this process, a concentric recording track 187 is formed on the medium. The radius difference between one recording track and a track adjacent to it is the track pitch T. As illustrated in FIG. 2A and FIG. 2B, the angle formed by the head and a recording track, namely the yaw angle 28, varies depending on the radius (track position). The maximum yaw angle is determined by the distance between the rotary actuator's rotational axis center and the magnetic head, the distance between the rotary actuator's rotational axis center and the magnetic disk medium's rotational center, and the radius of a magnetic disk medium recording area. FIG. 2A shows a case where the yaw angle is 0 degree, and FIG. 2B shows a case where the yaw angle is not 0 degree.

Figure 3:
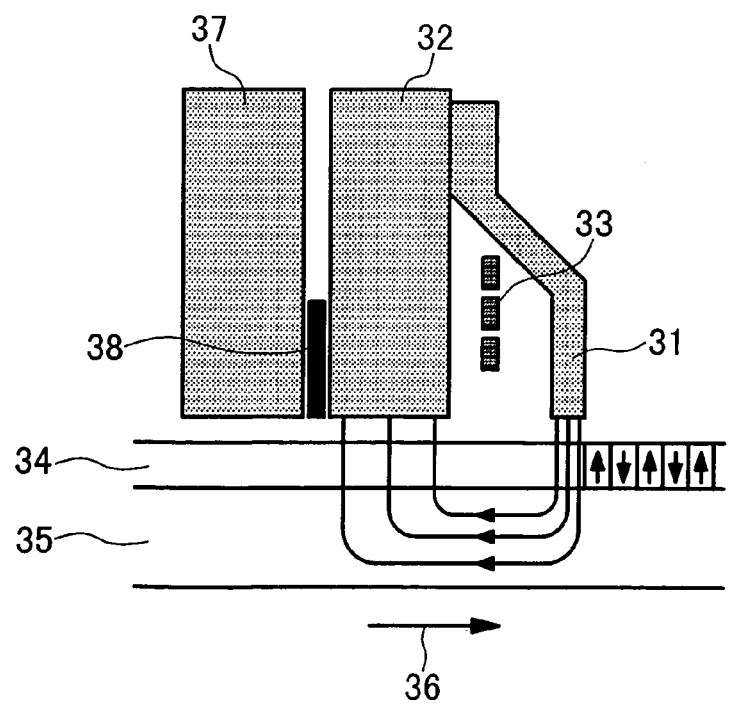
FIG. 3 is a schematic diagram showing the flow of a magnetic flux in the process of recording with a magnetic disk for perpendicular recording.

FIG. 3 is a schematic diagram showing the flow of magnetic flux between the head and the medium in the perpendicular recording process. A recording (writing) head, which is composed of a main pole 31, an auxiliary pole 32 and a coil 33, faces a perpendicular recording medium having a recording layer 34 and a soft magnetic under layer 35. As a current is applied to excite the coil 33, a magnetic field is perpendicularly generated between the tip of the main pole and the soft magnetic under layer 35, so that recording is produced in the recording layer 34 of the perpendicular recording medium. The magnetic flux which has reached the soft magnetic under layer 35 goes back to the auxiliary pole 32, thereby completing the magnetic circuit. Here, the recording magnetic field distribution depends on the shape of the main pole. It can be understood from the figure that writing is effected through the main pole's end, which is on the downstream side in the medium moving direction 36. On the other hand, reading is effected through a magnetoresistive effect element 38 located between the auxiliary pole 32 and a bottom shield 37.

FIGS. 4A and 4B one diagrams which schematically show the shape of the magnetic head main pole's surface facing the medium and a recording track according to this embodiment. FIG. 4A shows a case where the yaw angle is 0 degree, and FIG. 4B shows a case where the yaw angle is not 0 degree.

As illustrated in the figures, the main pole according to the present invention has the following profile on the air bearing surface: it is composed of a first portion 41 and a second portion 42, where the length of the first portion 41 in the cross-track direction continuously increases from the leading edge to the trailing edge, the second portion 42 is located on the side of the trailing edge of the first portion, and the length in the cross-track direction at the point of contact between the first and second portions, w, is equal to or shorter than the second portion's length in the cross-track direction at the trailing edge. The rate of change in the second portion's length in the cross-track direction, from the leading edge to the trailing edge, is different from the rate of change in the first portion's length in the cross-track direction, from the leading edge to the trailing edge.

It is desirable that the relation of x≧s be satisfied, where x denotes the angle formed by the normal to the second portion's trailing edge and the first portion's side edge on the track edge side, and s denotes the maximum angle (what is called a yaw angle) formed by the second portion's trailing edge and the direction perpendicular to the medium moving direction. Regarding the thickness t of the second portion, preferably the relation of t≦0.25·T/(sin(s)) should be satisfied, where T denotes the track pitch, or the distance between the center of the recording track and the center of a track adjacent to that track.

In this embodiment, the main pole is composed of two portions: the first portion 41, which is on the upstream side in the medium moving direction 44, has a width which continuously increases from the leading edge to the trailing edge, and the first portion's thickness is 350 nm and its trailing side width w is 250 nm. The second portion 42, which is positioned on the downstream side in the medium moving direction 44, has the same width w the trailing side width of the first portion 41, and thus its width is constant from the leading edge to the trailing edge. In other words, the second portion's length in the cross-track direction is constant from the leading edge to the trailing edge, and, therefore, the main pole's length in the cross-track direction discontinuously changes from the first portion's leading edge to the (main pole) trailing edge. More specifically, as shown in FIGS. 4A and 4B, because the first portion's length in the cross-track direction continuously increases from its leading edge to its trailing edge, its rate of change in the length in the cross-track direction is not zero, but a fixed value. On the other hand, the second portion's length in the cross-track direction is constant and its rate of change in the length in the cross-track direction is zero. The angle x formed by the normal to the second portion's trailing edge and the first portion's side edge on the track edge side is 10 degrees. The maximum yaw angle in the magnetic recording disk apparatus used in this embodiment is 10 degrees. It is equal to the above-said angle x. In this embodiment, the second portion's thickness t is 100 nm, so that the relation of t≦0.25·T/(sin(s)) is satisfied when the maximum yaw angle s is 10 degrees, and the track pitch T is 300 nm.

The cross sectional area of the main pole is constant from the surface facing the medium to the point of distance Ly along the normal to this surface in the direction towards the pole inside; and, when the distance from the surface exceeds Ly, the cross sectional area increases. The relation of Ly1 ≦≦Ly2 should be satisfied where Ly1 represents Ly for a film constituting the first portion and Ly2 represents Ly for a film constituting the second portion. In order to obtain a larger magnetic field, the saturation magnetic flux density of the film constituting the first portion, Bs1, should be larger than that of the film constituting the second portion, Bs2. In order to obtain a larger magnetic field gradient, Bs2 for the film constituting the second portion should be larger than Bs1 for the film constituting the first portion.

Referring to FIG. 5, in this embodiment, the width w of the main pole is constant from the surface facing the medium to the point of distance Ly along the normal to this surface in the direction towards the pole inside; and, when the distance from the surface exceeds Ly, the width increases. Here, the first portion and the second portion have the same distance Ly, in this case, 500 nm. The first portion and the second portion have the same saturation magnetic flux density Bs, in this case, 1.6T. FIG. 6 shows the magnetic field strength distribution on a line along the track center at a distance of 30 nm from the head surface, as a result of estimation by computer simulation. For comparison, a similar calculation was made on a magnetic head which has the same structure as the head in this embodiment, except for the profile of the main pole on the air bearing surface in which it is composed of a single portion with a width continuously increasing from the leading edge to the trailing edge, and the thickness of the main pole is 450 nm and the trailing edge width is 250 nm. Also, in this case, the angle x formed by the normal to the trailing edge and the side edge crossing the trailing edge is 10 degrees. It has been found that the magnetic field of the head in this embodiment is approx. 5% stronger than that of the head for comparison. This is attributable to the difference in the pole cross sectional area.

FIG. 7 shows the magnetic field strength distribution on a line at a distance of 120 nm from the track center, namely at the track edge. The graph indicates that the magnetic field of the head in this embodiment is 18% stronger than that of the head for comparison. The magnetic field at the track edge for the head in this embodiment is stronger than that for the head for comparison, so that the recording performance at the track edge is higher, and, thus, the effective track width is larger. As a result of calculation, it has been demonstrated that the effective track width for the head in this embodiment is 243 nm and that for the head for comparison is 225 nm. The head in this embodiment provides an increased track width and, thus, an improved S/N ratio, thereby ensuring that the magnetic recording disk apparatus in this embodiment operates with a prescribed track density.

Embodiment 2

Figure 8:
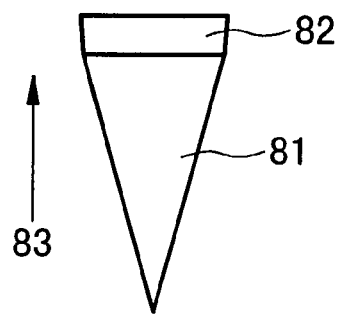
FIG. 8 is a schematic diagram showing the structure of a main pole according to an embodiment of the present invention.
Figure 9:
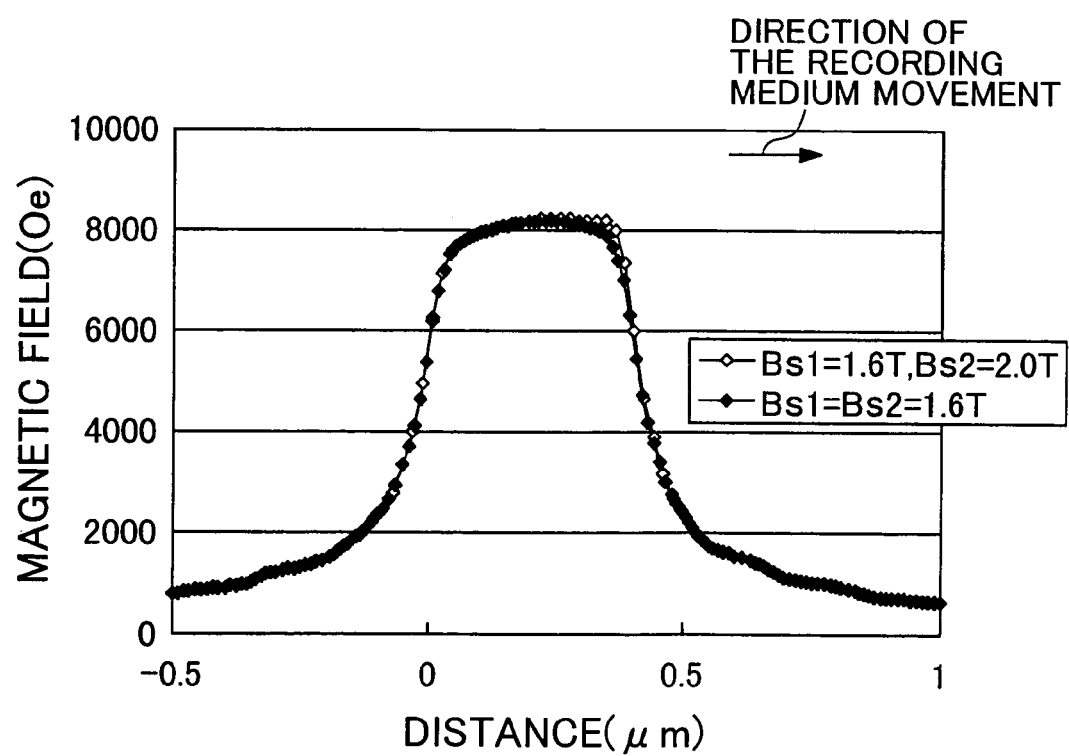
FIG. 9 is a graph showing the magnetic field distribution according to an embodiment of the present invention.

A second embodiment concerns a magnetic recording disk apparatus which is similar to the one according to the first embodiment, though it has a track pitch T of 230 nm and a maximum yaw angle s of 13 degrees. FIG. 8 schematically shows the profile of the main pole of the single-pole head used in the second embodiment on the air bearing surface. In this embodiment, the trailing edge width of a first portion 81, which continuously increases from the leading edge to the trailing edge, is 190 nm. The thickness of the first portion is 350 nm. In its second portion, which is on the side of the trailing edge of the first portion, there is a slight width increase from the leading edge to the trailing edge. More specifically, the width of the leading edge of the second portion is 190 nm and that of its trailing edge is 200 nm. Also, in this case, the change in the second portion's length in the cross-track direction from the leading edge to the trailing edge is discontinuous, with the change in the first portion's length in the cross-track direction from the leading edge to the trailing edge. The thickness t of the second portion 82 is 50 nm. The angle x formed by the normal to the second portion's trailing edge and the first portion's side edge on the track edge side is 15 degrees. In this embodiment, the first portion 81 is nearly triangular. Regarding the length Ly along which the pole width w is constant, Ly1 for the first portion is 220 nm and Ly2 for the second portion is 500 nm. In this embodiment, the saturation magnetic flux density Bs1 for the film of the first portion is 1.6T, and the saturation magnetic flux density Bs2 for the film of the second portion is 2.0T. For comparison, a similar calculation was made on a magnetic head in which the Bs for the first portion and the second portion is 1.6T. FIG. 9 shows the magnetic field strength distribution on a line along the track center at a distance of 30 nm from the head surface, as a result of estimation by computer simulation. It is obvious from the graph that the magnetic field strength for both the heads is almost equal.

Figure 10:
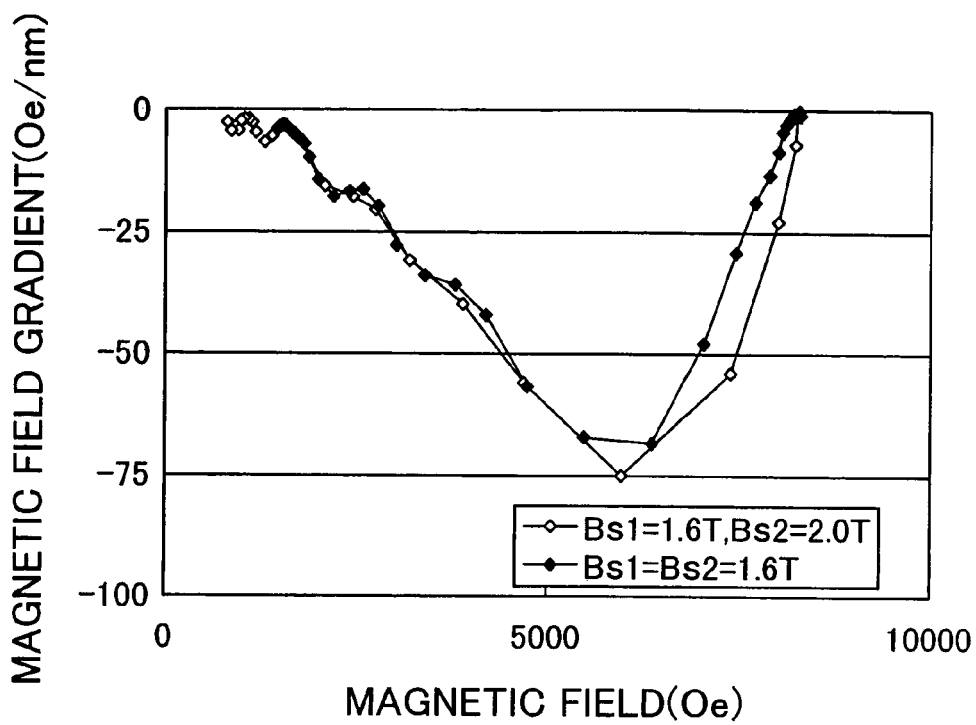
FIG. 10 is a graph showing magnetic field gradient variation with respect to the magnetic field according to an embodiment of the present invention.

FIG. 10 shows a magnetic field distribution on the downstream side in the medium moving direction where the horizontal axis represents the magnetic field and the vertical axis represents the magnetic field gradient. The graph indicates that the absolute value of the magnetic field gradient for the head with 2.0T as Bs2 for the second portion film is larger than the other head. This means that a larger magnetic field gradient leads to a better S/N ratio in writing/reading. In comparison of the S/N ratio in writing between the two heads, the head with 2.0T as Bs2 for the second portion film is 1.3 dB better in S/N ratio than the head with 1.6T as Bs2 for the second portion film.

Embodiment 3

Figure 11:
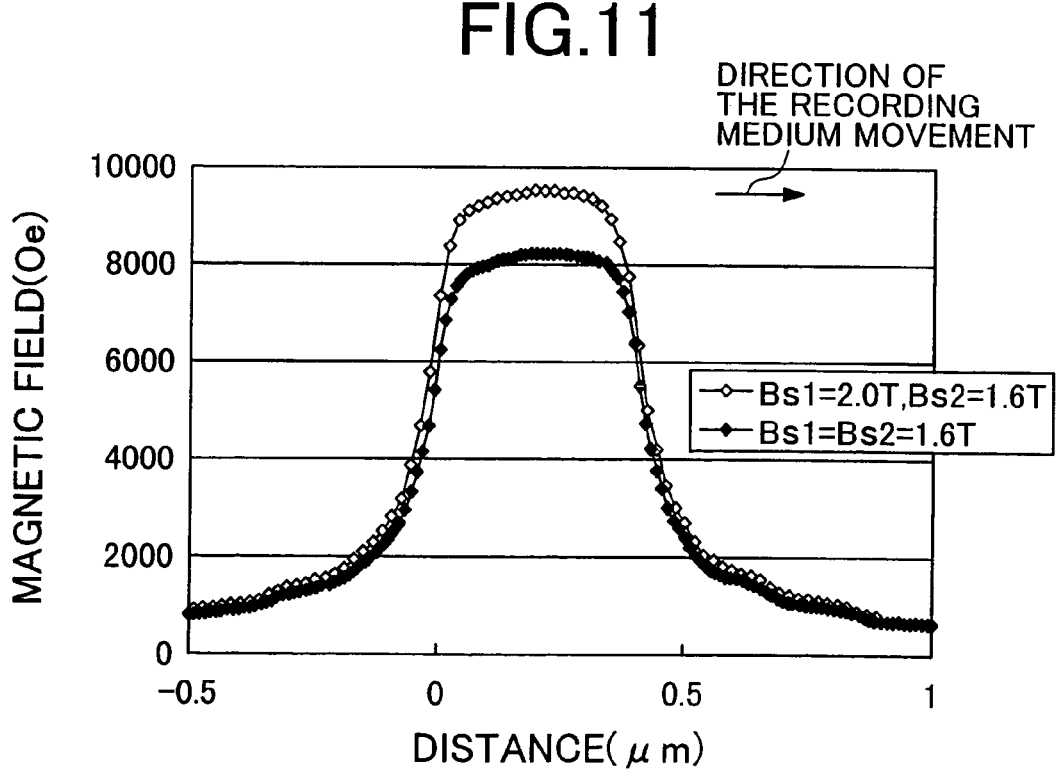
FIG. 11 is a graph showing the magnetic field distribution according to an embodiment of the present invention.

An experiment was conducted on a magnetic head which is the same as that in the first embodiment except that the Bs1 for the first portion film is 2.0T and the Bs2 for the second portion film is 1.6T. FIG. 11 shows a magnetic field strength distribution on a line along the track center at a distance of 30 nm from the head surface, as a result of estimation by computer simulation. For comparison, a similar calculation was made on a magnetic head in which the Bs for the first portion and the second portion is 1.6T. It is obvious from the graph that the magnetic field for the head with 2.0T as Bs for the first portion film is approx. 15% stronger than the other head. This means that it is possible to adequately write data even on a recording medium with a large coercive force. It has been demonstrated that when overwriting at a recording density of 700 kFCI is performed on a record made on a medium with a coercive force of 4.7 k Oe at a recording density of 88 kFCI using the head according to this embodiment, an overwrite of 32 dB is achieved.

Embodiment 4

Figure 12:
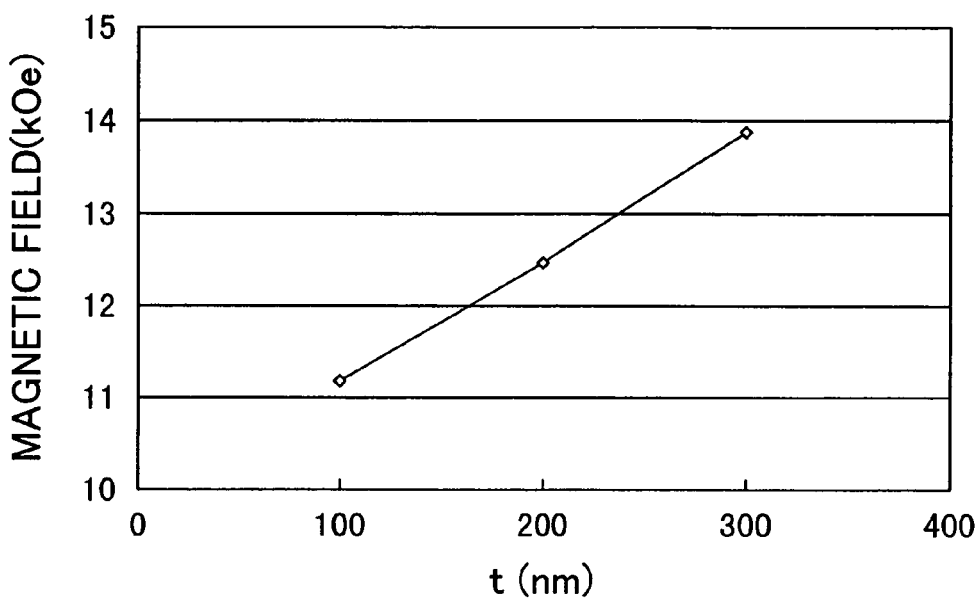
FIG. 12 is a graph showing the dependency of the magnetic field on the film thickness according to an embodiment of the present invention.
Figure 13:
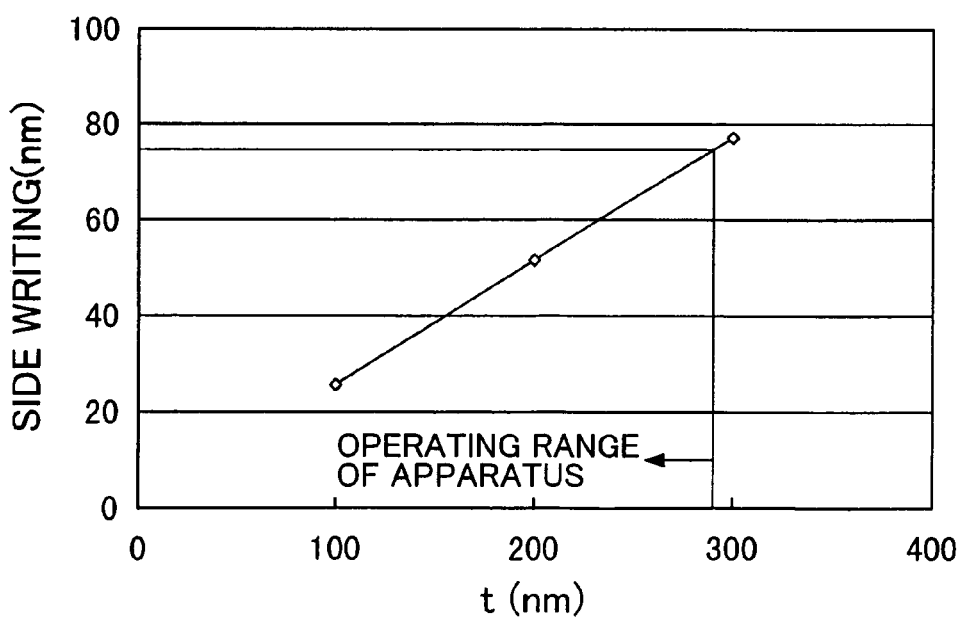
FIG. 13 is a graph showing the dependency of side writing on the film thickness according to an embodiment of the present invention.

In heads which are similar to the head according to the first embodiment, the second portion thicknesses t are 100 nm, 200 nm and 300 nm. In this fourth embodiment, the maximum yaw angle s is 15 degrees. The angle x formed by the normal to the second portion's trailing edge and the first portion's side edge on the track edge side is 17 degrees. When the track pitch T is 300 nm, the relation of $t \leq 0.25 \cdot T/(\sin(s))$ is satisfied provided that t is 100 nm or 200 nm. FIG. 12 shows an estimation of the maximum magnetic field strength on a line along the track center at a distance of 30 nm from the head surface. The graph indicates that the thicker the second portion is, the stronger the magnetic field is. FIG. 13 shows an estimation of side writing with these heads. Assuming that the maximum allowable amount of side writing for the apparatus is 25% of the track pitch, the maximum allowable side writing for a track pitch T of 300 nm is 75 nm. Therefore, when the maximum yaw angle s is 15 degrees, the second portion's maximum allowable thickness is 290 nm $(=0.25 \cdot T/(\sin(s)))$. In the case of a head with thickness t of 300 nm, the amount of side writing is large and the off-track margin is insufficient, so that it is impossible to attain a track pitch T of 300 nm. This means that the present invention is effective when the relation of $t \leq 0.25 \cdot T/(\sin(s))$ is satisfied.

Embodiment 5

FIG. 14 shows the shape of the magnetic head main pole's surface facing the medium according to this fifth embodiment. The main pole is composed of three portions. In a first portion 141, which is on the side of the leading edge of the pole, the width increases from the leading edge to the trailing edge continuously. The thickness of the first portion is 350 nm. The trailing edge width of the first portion is 190 nm.

The leading edge width of a second portion 142, which is on the trailing side of the first portion 141, is the same as the trailing edge width of the first portion and there is a slight increase in the width from the leading edge to the trailing edge. The thickness t2 of the second portion is 50 nm. Further, a third portion 143, which is on the trailing side of the second portion, has the same width as the trailing edge width of the second portion 142, and the width is constant (200 nm) from the leading edge to the trailing edge. The thickness t3 of the third portion is 50 nm. In this case, the rate of change in the length in the cross-track direction from the leading edge to the trailing edge is discontinuous (changes) at the point of contact between the first and second portions, and the point of contact between the second and third portions. The angle x formed by the normal to the third portion's trailing edge and the first portion's side edge on the track edge side is 15 degrees. When the maximum yaw angle s is 13 degrees, the third portion's track width w is 200 nm, and track pitch T is 230 nm, the relation of $t' \leq 0.25 \cdot T/(\sin(s))$ is satisfied where t' represents the sum of the thicknesses of the second and third portions.

Where Ly1, Ly2, and Ly3 represent Ly for the first portion, the second portion, and the third portion, respectively, Ly1, Ly2, and Ly3 are all 500 nm in this embodiment. The first portion film and the second portion film have the same saturation magnetic flux density Bs, in this case 1.8T, and Bs for the third portion film is 2.0T. The amount of side writing with this head is as small as approx. 18 nm, and the S/N ratio is improved by 0.7 dB as compared to the head according to the second embodiment.

Embodiment 6

The process of manufacturing the above-mentioned main poles according to the first to fifth embodiments is composed of the following steps: forming a resist pattern on an inorganic insulation film; making a groove with side walls perpendicular to the film plane by anisotropic etching of the inorganic insulation film using the resist pattern as a mask; taper-etching to taper the side walls of the groove; removing the resist pattern; making a magnetic film on the inorganic insulation film including this groove; and planarizing (flattening) the magnetic film by chemical mechanical polishing (CMP) or etching. These steps are taken sequentially.

The planarizing step may include a step of removing most of the magnetic film so as to make it form a recess in the inorganic insulation film, and then making another magnetic film over it, and a step of planarizing the magnetic film top face. Alternatively, the process may consist of the following steps: making, on a first inorganic insulation film, a second inorganic insulation film of another material; forming a resist pattern on the second inorganic insulation film; making a groove with side walls perpendicular to the film plane by anisotropic etching of the second inorganic insulation film using the resist pattern as a mask; taper-etching the first inorganic insulation film to taper the side walls of the groove; removing the resist pattern; making a magnetic film over the inorganic insulation film including this groove; removing most of the magnetic film so as to make it form a recess in the inorganic insulation film by chemical mechanical polishing (CMP) or etching; making another magnetic film over it; and planarizing the magnetic film top face. These steps are taken sequentially.

FIGS. 15A to 15G outline the process of manufacturing a main pole in a magnetic head according to the present invention (it should be noted that the magnification ratios for the figures are different). The process for a reading head is omitted here. FIG. 15B shows a resist pattern 152 formed on an inorganic insulation film 151 (FIG. 15A). The inorganic insulation film is made of commonly used material $Al_2O_3$, but it may be made of SiC, AlN, $Ta_2O_5$, TiC, $TiO_2$, $SiO_2$ or the like. A resist pattern is formed by exposure using a KrF excimer laser stepper. In the experiment, we used posi-resist TDUR-P201 available from Tokyo Ohka Kogyo Co., Ltd. When a resist film thickness of 0.7 μm was used, a resolution of 0.2 μm was attained. FIG. 15C shows that anisotropic etching is performed on the inorganic insulation film using the resist pattern as a mask.

When $Al_2O_3$ is used, $BCl_3$ or a mixture of $BCl_3$ and $Cl_2$, or a mixture of $BCl_3$ and Ar, may be used as an etching gas. When AlN is used, chlorine gases, as mentioned above, may be used. When easy-to-etch $Ta_2O_5$, TiC, $TiO_2$, $SiO_2$, SiC or the like is used, fluorine gases, such as $CHF_3$, $CF_4$, $SF_6$, and $C_4F_8$, may be used. The etching depth is 0.2 μm. Next, the step of taper etching is taken under different etching conditions (FIG. 15D). When etching $Al_2O_3$, for example, $BCl_3$ mixed with $CHF_3$ may be used. FIG. 15E shows that the resist is removed after etching. FIG. 15F shows that a magnetic film 153 is made over it. When using a plating technique, a plating base film is first made and then electroplating is performed. Magnetic materials such as CoNiFe, FeNi, CoFeCu, and FeCo may be used. After making the plating base film, if CMP is to be used for planarizing it, a stopper film for CMP may be provided, or if etching is to be done, an etching stopper film may be provided, though they are not shown here. If the film thickness can be controlled adequately during planarizing work, the step of making a stopper film may be omitted.

For a stopper film for CMP, a single layer film made of C, Ta, Mo, Nb, W, or Cr or an alloy lamination film may be used. In the experiment, we used a stopper film made by sputtering C. C is chemically stable and cannot be chemically polished; although, if it is mechanically polished, the polishing waste fluid is black, which makes it easy to detect the completion of polishing, thereby improving the controllability of the main pole film thickness.

For an etching stopper film, precious metals may be used because they cannot undergo reactive ion etching; for example, a single-layer film of Au, Pt, Pd, Ru, Rh, Cu, Ag, Tc, Re, Os or Ir or a lamination film or an alloy film may be used. In addition, Cr, Ni and the like may be used because they cannot undergo reactive ion etching. These types of stopper film may be all produced using a sputtering technique. Next, the step of making a magnetic film is shown in FIG. 15F. The magnetic film can be made using a plating technique or a sputtering technique. When using an electroplating technique, a plating base film must be formed before starting electroplating work. When using a sputtering technique, care must be taken not to generate voids in the magnetic film using a sputtering technique with high directivity, such as a long throw sputter technique or a collimation sputter technique, because the aspect ratio of the groove made through the steps shown in FIGS. 15C, 15D and 15E is large. When using an electroplating technique, $Fe_{55}Ni_{45}$ with a saturation magnetic flux density of 1.6T or CoNiFe with a saturation magnetic flux density of 2.2T may be used. For the plating base film, a magnetic film whose composition is the same as a plated film or a nonmagnetic film may be used.

FIG. 15G shows that a main pole 154 is formed on a planarized magnetic film top face. It has been found that when CMP or a similar polishing technique is used and a stopper film is made to stop polishing, it is possible to control the film thickness and completely planarize the top face with an accuracy of not more than 1 nm throughout the groove, which corresponds to the track width. In the experiment, a track width of 0.2 μm was obtained as in the step of forming a resist pattern, as shown in FIG. 15B, and the taper angle on the main pole lower side remained 10 degrees, as existed at the step of FIG. 15D. When using etching for this planarizing step, the following procedure may be used: resist is first coated and etching is performed for planarization using a chlorine gas, such as $BCl_3$ or a mixture of $BCl_3$ and $Cl_2$ ("etch-back"). If that is the case, a stopper film made of any of the above-mentioned precious metals or Ni, Cr or the like may be useful. According to the main pole manufacturing process, as defined by this embodiment, there will be little track width fluctuation in the manufacture of many elements, namely a higher track width accuracy in the manufacture will be achieved.

As discussed above, the main pole manufacturing process according to the present invention reduces the track width fluctuation in the manufacture of many elements resulting in a smaller track width tolerance.

Embodiment 7

Figure 16A:
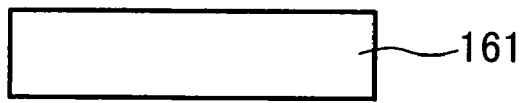
FIG. 16A shows an inorganic insulation film in the main pole manufacturing process according to the present invention.
Figure 16B:
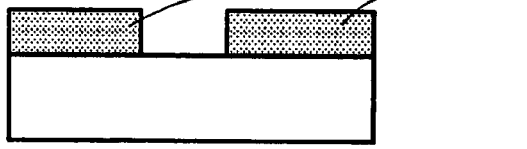
FIG. 16B shows a resist pattern formed on the inorganic film in the main pole manufacturing process.
Figure 16C:
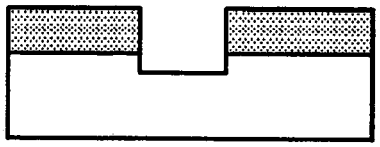
FIG. 16C shows anisotropic etching carried out on the inorganic insulation film in the main pole manufacturing process.
Figure 16D:
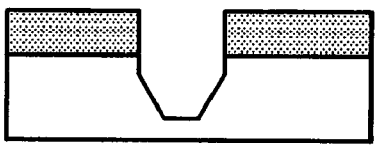
FIG. 16D shows taper etching in the main pole manufacturing process.
Figure 16E:
FIG. 16E shows removal of the resist in the main pole manufacturing process.
Figure 16F:
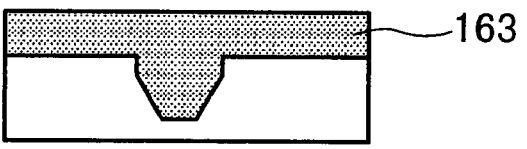
FIG. 16F shows formation of a magnetic film in the main pole manufacturing process.
Figure 16G:
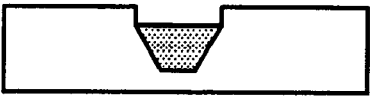
FIG. 16G shows dishing of the magnetic film in the main pole manufacturing process.
Figure 16H:
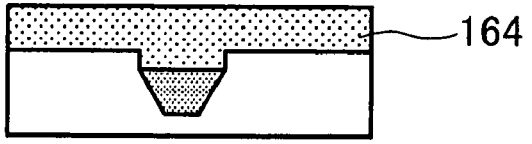
FIG. 16H shows formation of a magnetic film in the main pole manufacturing process.
Figure 16I:
FIG. 16I shows planarization of the magnetic film to obtain a main pole in the main pole manufacturing process.

The main pole manufacturing process according to a seventh embodiment uses the same steps (FIGS. 16A to 16F) as the steps shown in FIGS. 15A to 15F according to the sixth embodiment. However, it also includes additional steps. At the step of FIG. 16G, for example, the acidity of CMP slurry is increased, and the magnetic film is dished or recessed from the inorganic insulation film surface. At the step of FIG. 16H, a magnetic film 164 is deposited, for example, by sputtering. For this purpose, FeCo with a saturation magnetic flux density Bs of 2.4T, or a similar material, may be used. The use of a material with a high saturation magnetic flux density for the top face permits a steeper magnetic field gradient from the head, thereby improving the recording characteristics. At the step of FIG. 16I, a slurry which is different from the slurry used at the step of FIG. 16G is used to planarize the magnetic film and obtain a main pole 165.

Embodiment 8

Figure 17A:
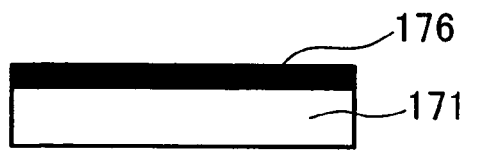
FIG. 17A shows an inorganic insulation film in the main pole manufacturing process according to the present invention.
Figure 17B:
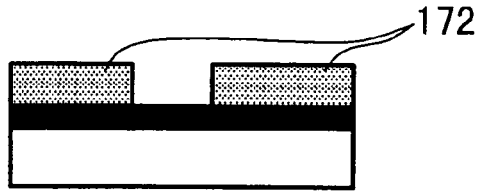
FIG. 17B shows a resist pattern formed on the inorganic film in the main pole manufacturing process.
Figure 17C:
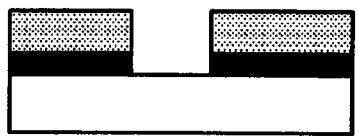
FIG. 17C shows anisotropic etching carried out on the inorganic insulation film in the main pole manufacturing process.
Figure 17D:
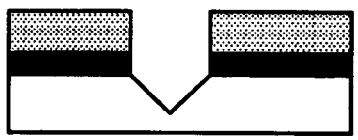
FIG. 17D shows taper etching in the main pole manufacturing process.
Figure 17E:
FIG. 17E shows removal of the resist in the main pole manufacturing process.
Figure 17F:
FIG. 17F shows formation of a magnetic film in the main pole manufacturing process.
Figure 17G:
FIG. 17G shows dishing of the magnetic film in the main pole manufacturing process.
Figure 17H:
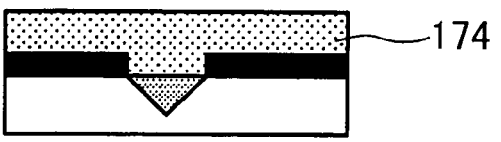
FIG. 17H shows formation of a magnetic film in the main pole manufacturing process.
Figure 17I:
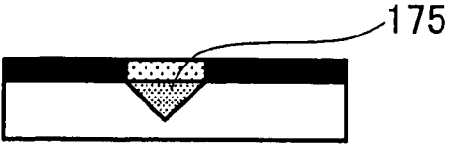
FIG. 17I shows planarization of the top face of the magnetic film to obtain a main pole in the main pole manufacturing process.

FIGS. 17A to 17I outline the process of manufacturing a main pole in a magnetic head according to the present invention (it should be noted that the magnification ratios for the figures are different). The process used for manufacture of a reading head is omitted here. FIG. 17A shows that on an inorganic insulation film 171, an inorganic insulation film 176 of another material is formed. When the inorganic insulation film 171 is made of $Al_2O_3$, the inorganic insulation film 176 may be made of, for example, $SiO_2$. FIG. 17B shows a resist pattern 172 formed on it. FIG. 17C shows that the inorganic insulation film 176 is etched using the resist pattern as a mask. When the inorganic insulation film 176 is made of $SiO_2$, the gases $CHF_3$, $CF_4$ or the like may be used as an etching gas to make the side face vertical. FIG. 17D shows that the inorganic insulation film 171 is etched using, for example, BCl₃ gas. At this step, the side face is tapered by etching. Since the material of the inorganic insulation film 171 is different from that of the inorganic insulation film 176, the profile can be controlled easily using different etching conditions. FIG. 17E shows that the resist pattern 172 is removed. FIG. 17F shows formation of a magnetic film 173. FIG. 17G shows that the magnetic film is dished or recessed from the inorganic insulation film 176 as in FIG. 16G. FIG. 17H shows formation of a magnetic film 174. FIG. 17I shows that the top face of the magnetic film is planarized to obtain a main pole 175.

Embodiment 9

A ninth embodiment of the present invention concerns a process of manufacturing a single-pole magnetic head, which is characterized in that a main pole is manufactured by sequentially taking the following steps: forming a resist pattern on an inorganic insulation film; making a groove with side walls virtually perpendicular to the film plane by anisotropic etching of the inorganic insulation film using the resist pattern as a mask; taper-etching to taper the side walls of the groove; removing the resist pattern; making a magnetic film over the inorganic insulation film including this groove; and planarizing the magnetic film by chemical mechanical polishing (CMP) or etching.

Alternatively, it concerns a process of manufacturing a single-pole magnetic head, which is characterized in that a main pole is manufactured by sequentially taking the following steps: forming a resist pattern on an inorganic insulation film; making a groove with side walls virtually perpendicular to the film plane by anisotropic etching of the inorganic insulation film using the resist pattern as a mask; taper-etching to taper the side walls of the groove; removing the resist pattern; making a first magnetic film over the inorganic insulation film including this groove; removing most of the first magnetic film by chemical mechanical polishing (CMP) or etching so as to make it form a recess in the inorganic insulation film; making a second magnetic film over the inorganic insulation film, including the groove having the first magnetic film; and planarizing the second magnetic film top face.

Furthermore, alternatively, it concerns a process of manufacturing a single-pole magnetic head, which is characterized in that a main pole is manufactured by sequentially taking the following steps: making, on a first inorganic insulation film, a second inorganic insulation film of another material; forming a resist pattern on the second inorganic insulation film; making a groove with side walls virtually perpendicular to the film plane by anisotropic etching of the second inorganic insulation film using the resist pattern as a mask; taper-etching the first inorganic insulation film to taper the side walls of the groove; removing the resist pattern; making a first magnetic film over the inorganic insulation film, including this groove; removing most of the magnetic film by chemical mechanical polishing (CMP) or etching so as to make it form a recess in the inorganic insulation film; making a second magnetic film over the inorganic insulation film including the groove having the first magnetic film; and planarizing the second magnetic film top face.

Embodiment 10

A tenth embodiment of the present invention concerns a magnetic head slider comprising a writing element having a main pole, a magnetic head having a reading element, and a slider having an air inlet end and an air outlet end, the main pole consisting of a first portion and a second portion provided at the air outlet end side of the first portion, where the thickness of the second portion is smaller than that of the first portion and the profile of the first portion on the magnetic head air bearing surface is such that its length in the cross-track direction continuously increases from the air inlet end to the air outlet end.

Figure 19:
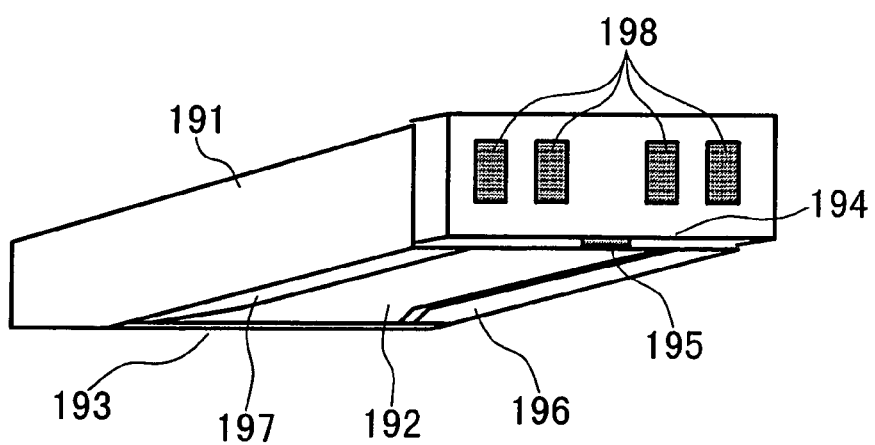
FIG. 19 is a diagrammatic perspective view which shows a magnetic head slider according to an embodiment of the present invention.

The head slider is roughly illustrated in FIG. 19. The magnetic head slider 191 has rails 196 and 197 on its air bearing surface 192 so that it can be floated or borne by air which flows from an air inlet end 193 to an air outlet end 194 when it is placed on a rotating medium for magnetic perpendicular recording. At the air outlet end side, there are a magnetic head element 195 and electrodes 198 for data input/output with the magnetic head element 195.

Embodiment 11

An eleventh embodiment of the present invention concerns a head disk assembly comprising a magnetic head having a writing element with a main pole and a reading element, a slider having an air inlet end and an air outlet end, a suspension supporting the slider, a rotary actuator supporting the suspension, and a magnetic disk medium facing the magnetic head, the main pole consisting of a first portion and a second portion provided at the air outlet end side of the first portion, where the thickness of the second portion is smaller than that of the first portion and the profile of the first portion on the magnetic head air bearing surface is such that its length in the cross-track direction continuously increases from the air inlet end to the air outlet end.

Furthermore, the head disk assembly may be characterized in that the magnetic disk medium has a plurality of recording tracks and the relation of $t \leq 0.25 \cdot T/(\sin(s))$ is satisfied, where t represents the thickness of the second portion of the main pole, s the maximum yaw angle and T a track pitch, as the distance between the center of a recording track among the plural recording tracks and the center of a track adjacent to that track.

According to the present invention, a magnetic head for perpendicular recording uses a main pole which is composed of at least two portions where the width of the first portion continuously increases from the upstream side to the downstream side in the medium moving direction, and the width of the second portion is the same as the width of the first portion's downstream edge in the medium moving direction and is almost constant from the upstream side to the downstream side in the medium moving direction, so that the amount of side writing is reduced and the recording performance at the track edge is increased, thereby preventing the effective track width from decreasing. The use of a film with a higher saturation magnetic flux density, which constitutes the second portion, provides a steeper recording magnetic field gradient and thus improves the S/N ratio. Also, the use of a film with a higher saturation magnetic flux density, which constitutes the first portion, increases the absolute value of recording magnetic field strength and assures a satisfactory recording performance for a recording medium with a high coercive force.

When the main pole manufacturing process according to the present invention is followed, there will be little track width fluctuation in the manufacture of many elements, and thus the track width tolerance will be decreased. The invention also provides a magnetic recording disk apparatus with improved track density, which uses this type of head.

What is claimed is:

1. A magnetic head comprising a main pole;
   wherein said main pole has a first portion having a length (W1) in a cross-track direction which continuously increases from a leading edge side to a trailing edge side, a second portion formed on the trailing edge side of the first portion, and a third portion formed on a trailing edge side of the second portion;
   wherein a length (W2) in the cross-track direction of a boundary line between the second portion and the third portion is longer than W1, and
   wherein a length (W3) in the cross-track direction of a trailing edge of the third portion is substantially equal to W2.

2. A magnetic head according to claim 1, wherein a saturation magnetic flux density of the third portion is larger than a saturation magnetic flux density of the first portion.

3. A magnetic head according to claim 1, wherein the saturation magnetic flux density of the third portion is larger than a saturation magnetic flux density of the second portion.

4. A magnetic head according to claim 2, wherein the second portion has a saturation magnetic flux density which is same as the saturation magnetic flux density of the first portion.

5. A magnetic head according to claim 3, wherein the saturation magnetic flux density of the second portion is same as a saturation magnetic flux density of the first portion.

6. A magnetic head according to claim 1, wherein a rate of change in a length of the second portion in the cross-track direction from a leading edge to a trailing edge thereof is different from a rate of change in the length of the first portion in the cross-track direction from the leading edge to the trailing edge thereof.

* * * * *